United States Patent [19]

Matsuzawa et al.

[11] Patent Number: 5,388,325
[45] Date of Patent: Feb. 14, 1995

[54] PROCESS FOR FABRICATING A MAGNETIC HEAD CORE SLIDER

[75] Inventors: Soichiro Matsuzawa, Kuwana; Nobuhiro Terada, Kasugai, both of Japan

[73] Assignee: NGK Insulators, Ltd., Japan

[21] Appl. No.: 141,649

[22] Filed: Oct. 27, 1993

Related U.S. Application Data

[62] Division of Ser. No. 847,683, Mar. 6, 1992, Pat. No. 5,285,342.

[30] Foreign Application Priority Data

Mar. 28, 1991 [JP] Japan .................. 3-91121

[51] Int. Cl.$^6$ .......................... G11B 5/42
[52] U.S. Cl. ...................... 29/603; 360/121; 360/127
[58] Field of Search ............ 29/603; 360/119–121, 360/125, 127

[56] References Cited

U.S. PATENT DOCUMENTS

| | | | |
|---|---|---|---|
| 3,502,821 | 3/1970 | Duinker | 29/603 |
| 3,922,776 | 12/1975 | Alger et al. | 29/603 |
| 4,729,161 | 3/1988 | Verbunt et al. | 29/603 |
| 4,939,608 | 6/1990 | Okamura et al. | 360/125 X |
| 4,948,460 | 8/1990 | Sandaiji et al. | 29/603 X |
| 5,056,353 | 10/1991 | Matono | 29/603 X |

*Primary Examiner*—Carl E. Hall
*Attorney, Agent, or Firm*—Parkhurst, Wendel & Rossi

[57] ABSTRACT

A core chip for a magnetic head core slider, including a first and a second core member which are bonded together so as to define a coil-winding aperture. The two core members cooperate to provide a gap-forming portion defining a magnetic gap on one side of the coil-winding aperture, and a cut-off portion provided adjacent to the gap-forming portion. The cut-off portion is removed by grinding at the top surface to establish the nominal depth of the magnetic gap. The cut-off portion has a distance marker which extends from the top surface down to the gap-forming portion and which has an end portion adjacent to the gap-forming portion. The end portion is shaped so as to indicate a distance between the top surface and the gap-forming portion, that is, the depth of the magnetic gap, when the cut-off portion is removed to provide a sliding surface of the core chip in which the magnetic gap is open. Also disclosed is a process of fabricating the magnetic head core slider using the core chip.

6 Claims, 10 Drawing Sheets

PROCESS FOR FABRICATING A MAGNETIC HEAD CORE SLIDER

This is a divisional of application Ser. No. 07/847,683 filed Mar. 6, 1992, now U.S. Pat. No. 5,285,342, issued Feb. 8, 1994.

BACKGROUND OF THE INVENTION

1. Field of the Invention

The present invention relates generally to a core chip for a magnetic head and a process of fabricating a head core slider using the core chip, and more particularly to a technique for forming a magnetic gap in the core chip so that the depth of the magnetic gap is accurately controlled by grinding the core chip.

2. Discussion of the Prior Art

In the art of rigid or floppy magnetic disk drives (RDD or FDD), there has been used a magnetic head core slider which has a slider body, and a core chip bonded or fixed in the slider body. The core chip has a magnetic gap with a suitable size formed so as to extend across an annular magnetic path which is defined by a coil-winding aperture formed in the core chip. It is noted that the depth dimension as well as the width dimension of the magnetic gap are important factors which affect the operating characteristics of the magnetic head. The depth dimension of the magnetic gap is a dimension between the sliding surface of the core chip for sliding contact with a magnetic recording medium such as a magnetic disk, and an end of the coil-winding aperture, which end is nearest to the sliding surface in the direction perpendicular to the sliding surface. After the core chip is fixed in the slider body, the surface of the core chip in which the magnetic gap is open, and the corresponding surfaces of the slider body are ground so as to obtain the desired or nominal depth dimension of the magnetic gap. Conventionally, however, this grinding operation suffers from various problems, in terms of the accuracy of the depth dimension of the magnetic gap, for example.

In the conventional fabrication of a floppy disk drive (FDD) magnetic head core slider, for instance, the height of the slider body and the depth dimension of the core chip are measured before the core chip is fixed in the slider body. Based on the measured dimensions, the appropriate surfaces of the slider body and the core chip fixed in the slider body are ground so as to establish the nominal depth dimension of the magnetic gap, by estimating or calculating the gap depth dimension from the amount of stock removed by the grinding operation. Therefore, this grinding operation requires the measurement of the depth dimension of the magnetic gap before the core chip is fixed in the slider body, and also requires the calculation of the amount of grinding (estimation of the current gap depth dimension) during the grinding operation. Thus, the conventional method does not permit efficient fabrication of the magnetic head core slider.

In the conventional fabrication of a rigid disk drive (RDD) magnetic head core slider, a core chip is accommodated in a chip-receiving groove formed in a slider body which has a pair of parallel air bearings defined by parallel grooves formed by grinding wheels, for example. The core chip is fixed in the chip-receiving groove with a glass filler, and the air bearing surfaces of the slider body and the corresponding sliding surface of the core chip are ground to obtain the nominal depth dimension of the magnetic gap. The depth dimension of the magnetic gap during the grinding operation is measured through the glass filler, in a direction inclined with respect to the direction of depth of the magnetic gap. Based on the measured gap depth dimension, the grinding operation is performed. However, the in-process measurement of the gap depth dimension in the above-indicated inclined direction requires an optical instrument capable of compensating for a measuring error due to the refractive index of the glass filler, and makes the grinding operation difficult or complicated, whereby the grinding operation tends to be costly and difficult to be performed for accurate control of the depth dimension of the magnetic gap.

SUMMARY OF THE INVENTION

It is therefore a first object of the present invention to provide a core chip for a magnetic head core slider, which permits easy and accurate control of the depth dimension of its magnetic gap, by grinding the core chip after it is fixed in a slider body.

The first object may be achieved according to one aspect of the present invention, which provides a core chip for a magnetic head core slider, including a first and a second core member which are butted and bonded together so as to define a coil-winding aperture and which cooperate to provide a gap-forming portion on one side of the coil-winding aperture, and a cut-off portion which is provided adjacent to the gap-forming portion and which provides a top surface of the core chip, the gap-forming portion defining a magnetic gap which extends from the aperture and which is open in the top surface of the core chip, the cut-off portion being removed by grinding at the top surface to establish a nominal depth dimension of the magnetic gap, the first and second core members having a pair of width-defining grooves which extend therebetween so as to define a track whose width dimension determines a width dimension of the magnetic gap, the instant core chip being characterized in that a distance marker is provided in the cut-off portion so as to extend from the top surface of the core chip to the gap-forming portion. The distance marker has an end portion adjacent to the gap-forming portion. This end portion is shaped so as to indicate a distance between the top surface and the gap-forming portion when the cut-off portion is removed to provide a sliding surface of the core chip in which the magnetic gap is open and which determines the nominal depth dimension of the magnetic gap.

According to the core chip of the present invention constructed as described above, one end of the distance marker is initially exposed on the top surface of the core chip, namely, on the surface which is to be ground to remove the cut-off portion to establish the nominal depth dimension of the magnetic gap. As the grinding operation proceeds to remove the cut-off portion together with the distance marker, the distance marker is removed, and the end portion of the distance marker which is opposite to the initially exposed end is exposed on the ground surface. The end portion is shaped so as to indicate the distance from the ground surface to the end of the gap-forming gap, such that a dimension of the exposed end portion of the distance marker varies with the distance from the ground surface down to the end of the gap-forming portion which is to be finally exposed with the cut-off portion removed by grinding so as to provide the sliding surface of the core chip. Thus, the depth of grinding or amount of stock removal by grinding of the cut-off portion required to establish the nominal depth dimension of the magnetic gap can be readily calculated or determined on the basis of the dimension of the exposed end portion of the distance marker, which can be directly measured during the grinding operation from time to time. Namely, the depth dimension of the magnetic gap is the distance between the end of the coil-winding aperture and the level of the ground surface on which the suitably shaped end portion of the distance marker is exposed so as to indicate the distance, i.e., the magnetic gap width.

Described more specifically, the cut-off portion to be removed by grinding consists of opposed portions of the first and second core members which have opposed surfaces. The distance marker may be a protrusion or a recess formed on at least one of the opposed surfaces. The dimension of the end portion of the distance marker is preferably the width as measured parallel to the direction of width of the magnetic gap (width of the track) which is perpendicular to the direction of extension of the track. For instance, the end portion of the distance marker is shaped so that the width continuously decreases in the direction from the top surface of the core chip (the surface of the cut-off portion to be ground) toward the gap-forming portion. The shape of the end portion of the distance marker may be a triangle such as an equilateral or right-angled triangle having an apex at the end of the gap-forming portion, i.e., the level of the finally ground surface which serves as the sliding surface of the core chip. Where the end portion is a right-angled triangle, the width of the exposed end portion of the distance marker during the grinding operation may be made equal to the required depth of the grinding that should be further effected to establish the nominal depth dimension of the magnetic gap.

A second object of the invention is to provide a process of fabricating a magnetic head core slider using the core chip constructed as described above, by grinding the core chip to establish the nominal depth dimension of the magnetic gap of the core chip fixed in a slider body.

This second object may be achieved according to another aspect of this invention, which provides a process of fabricating a magnetic head core slider including a core chip constructed as described above, the process comprising the steps of: (a) fixing the core chip in a slider body; and (b) grinding the top surface of the core chip to remove the cut-off portion, and a corresponding surface of the slider body, by an amount corresponding to the distance between the top surface and the gap-forming portion, which is indicated by the end portion of the distance marker, so as to establish the nominal depth dimension of the magnetic gap and provide a sliding surface on the slider body. In practice, the above-indicated distance is determined or calculated, during an interruption of the grinding operation, based on a measured dimension of the exposed end portion of the distance marker, for example, based on the measured width dimension of the remaining end portion of the distance marker, so that the required depth of the grinding to be further effected is found.

The track initially formed on the core chip may be a preliminary track whose width is larger than the effective or nominal width. In this case, the process may further comprise etching the sliding surface of the preliminary track to form a pair of opposed final width-defining recesses adjacent to the magnetic gap. The final width-defining recesses define an effective track which extends across the magnetic gap. The effective track has the nominal width smaller than the width dimension of the preliminary track, and a length smaller than the preliminary track. The nominal width of the effective track determines the nominal width of the magnetic gap smaller than the width dimension of the magnetic gap before the opposed final width-defining recesses are formed. This arrangement permits easy formation of the track whose nominal width is sufficiently small to provide for a high-density recording operation.

The present process may further comprise the step of forming on the slider body a pair of parallel air bearings as the sliding surface of the slider body. In this instance, a chip-receiving groove is formed through one of lengthwise opposite end portions of one or each of the two air bearings, and the core chip is accommodated in the chip-receiving groove. The core chip is bonded in the chip-receiving groove with a glass filler, such that the top surface of the core chip is exposed on the appropriate lengthwise end portion of the air bearing or bearings. The present process is suitable for producing a composite type magnetic head core slider for a rigid disk drive (RDD) device.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1A:
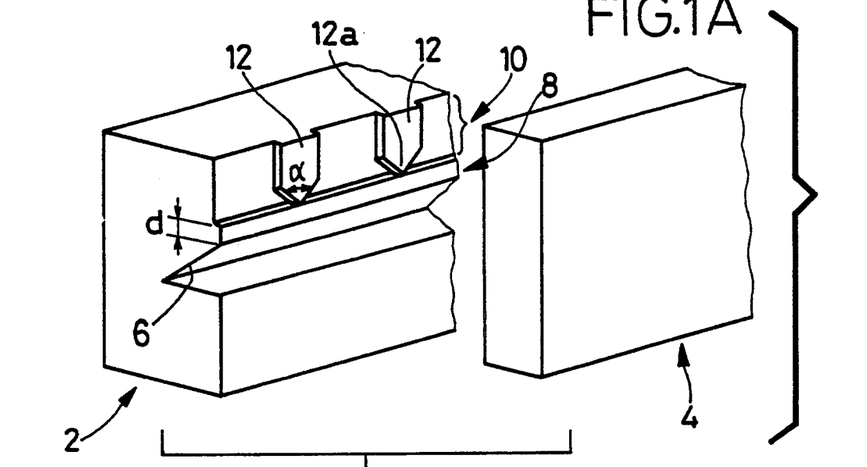
FIGS. 1A, 1B and 1C are views showing process steps for fabricating core chips for a magnetic head according to one embodiment of this invention.
Figure 1B:
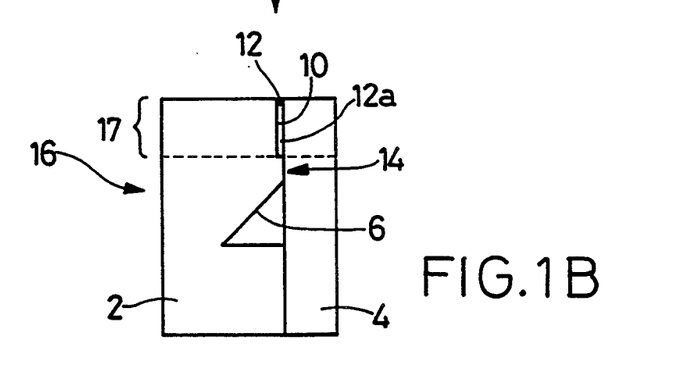
Figure 1C:
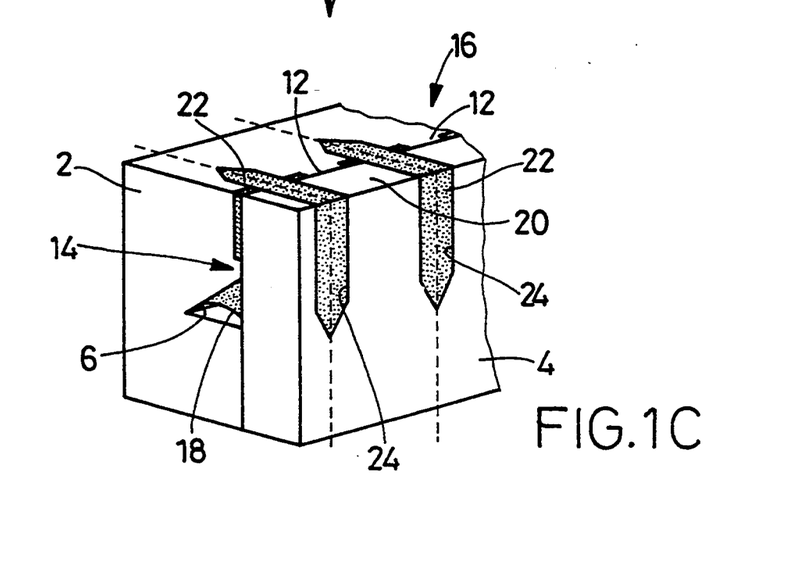

Referring first to FIGS. 1A, 1B and 1C, there are illustrated process steps for fabricating a core chip, for a magnetic head core slider for a floppy disk drive (FDD) device. The core chip fabricated is indicated generally at 26 in FIG. 2. In FIG. 1A, reference numerals 2 and 4 denote a first core member and a second core member in the form of a C-shaped core bar and an I-shaped core bar, respectively. These core bars 2, 4 are made of ferrite or other known material suitable for a magnetic head core. The C-shaped core bar 2 has a coil-winding groove 6 to provide a coil-winding aperture when the two core bars 2, 4 are butted and bonded together into an integral gap bar 16, as shown in FIG. 1B in which the reference numeral 6 is also used to denote the coil-winding aperture. In the presence of the aperture 6, the gap bar 16 has a substantially annular magnetic path.

As shown in FIG. 1A, the C-shaped core bar 2 has an elongate gap-forming portion 8 formed along the coil-winding groove 6, on one of opposite sides of the groove as seen in the direction perpendicular to the direction of length of the core bar 2 (direction of extension of the groove 6). The gap-forming portion 8 and the groove 6 are provided on the abutting surface of the C-shaped core bar 2, at which the core bar 2 is butted on the I-shaped core bar 4 such that the two core bars 2, 4 cooperate to define the coil-winding aperture 6. The gap-forming portion 8 provided on the upper side of the groove 6 (as seen in FIG. 1A) cooperates with the corresponding portion of the abutting surface of the I-shaped core bar 4, to define a magnetic gap 14 which extends from the upper end of the aperture 6, as shown in FIG. 1B. The gap-forming portion 8 has a width "d" corresponding to the depth dimension of the gap 14.

The C-shaped core bar 2 also has a cut-off portion 10 which overlies the gap-forming portion 8, and the gap bar 16 has a corresponding cut-off portion 17 consisting of the cut-off portion 10 of the core bar 2 and the corresponding portion of the core bar 4. As described below in detail, this cut-off portion 17 is finally removed by grinding, so as to establish the nominal depth dimension ("d") of the magnetic gap 14 as measured down to the upper end of the coil-winding aperture 6.

As is apparent from the perspective view of FIG. 1A, the cut-off portion 10 of the core bar 2 is a generally recessed portion whose surface is lower than the top surface of the gap-forming portion 8. The cut-off portion 10 is formed with a plurality of distance markers 12, 12 which are spaced apart from each other in the direction of extension of the gap-forming portion 8. Each distance marker 12 extends from the top surface of the cut-off portion 10 down to the upper end face of the gap-forming portion 8, and has substantially the same height as the gap-forming portion 8. The distance marker 12 has an equilateral-triangular end portion 12a whose extreme end is continuous to the upper end face of the gap-forming portion 8, as shown in FIG. 1A. Namely, the lower apex of the equilateral triangle of the end portion 12a is located at the upper end of the gap-forming portion 8. The triangular end portion 12a has a vertical angle α, and the width of the end portion 12a as measured in the direction of extension of the gap-forming portion 8 continuously decreases in the direction from the top surface of the core bar 2 toward the gap-forming portion 8.

The cut-off portion 10 of the core bar 2 having the distance markers 12 may be formed by a known etching method. Where the core bars 2, 4 as the core members are made of a ferrite material, for example, the cut-off portion 10 may be easily formed by a chemical etching technique using an aqueous solution of phosphoric acid.

The gap bar 16 is prepared by butting and bonding together the C-shaped and I-shaped core bars 2, 4 by a known method, for instance, by using a bonding material, whereby the magnetic gap 14 is defined between the gap-forming portion 8 and the corresponding portion of the core bar 4, while the coil-winding aperture 6 is formed between the two core bars 2, 4, as shown in FIG. 1B.

Then, the magnetic gap 14 and an upper portion of the coil-winding aperture 16 formed in the gap bar 16 are filled with a protective glass filler 18, as shown in FIG. 1C. However, the protection of the magnetic gap 14 by the protective glass filler 18 is not essential. Subsequently, the gap bar 16 is subjected to a grooving operation to form a plurality of parallel inclined width-defining grooves 24 such that the grooves 24 are spaced apart from each other in the direction of length of the gap bar 16, and such that each distance marker 12 is disposed between the adjacent grooves 24. Each inclined width-defining groove 24 extends from the top surface of the C-shaped core bar 2 to the side surface of the I-shaped core bar 4, such that the bottom of the groove 24 is inclined so as to pass the upper end of the coil-winding groove 6. That is, each groove 24 extends across the magnetic gap 14. In the presence of the grooves 24, tracks 20 are formed on the top surface of the gap bar 16, such that the width of each track 20 is defined by the adjacent two width-defining grooves 24, as shown in FIG. 1C.

Figure 2:
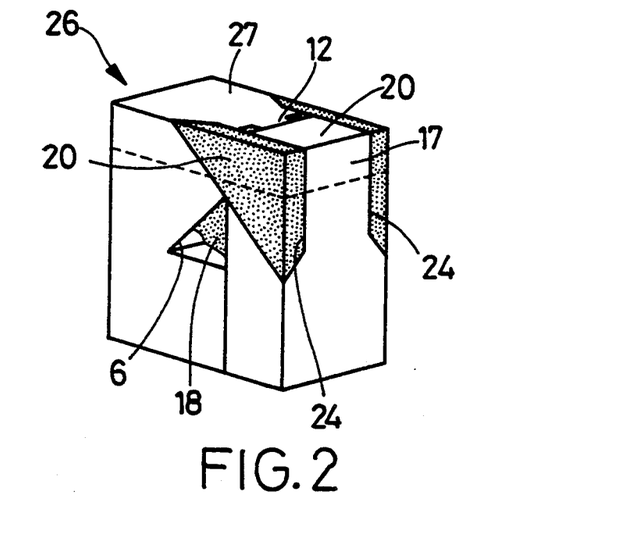
FIG. 2 is a perspective view showing one of the core chips fabricated in the process steps of FIGS. 1A–1C.

The thus grooved gap bar 16 is then subjected to a cutting operation in which the gap bar 16 is cut along parallel planes indicated in dashed line in FIG. 1C. Thus, there are prepared a plurality of core chips 26, one of which is shown in FIG. 2, as previously mentioned. Each core chip 26 has the cut-off portion 17 which has the distance marker 12 whose upper end is exposed on a top surface 27 which includes the surface of the track 20 whose width is defined by the adjacent two inclined width-defining grooves 24, as shown in FIG. 2. Therefore, the upper end of the distance marker 12 is externally visible.

The nominal depth dimension of the magnetic gap 14 is established by removing the cut-off portion 17 by grinding the top surface 27. In operation of the core chip 26, the ground top surface 27 serves as the sliding surface for sliding contact with a magnetic disk. As the cut-off portion 17 is ground at the top surface 27, the distance marker 12 is gradually removed, and the triangular end portion 12a is eventually exposed on the ground top surface 27. Since the vertical angle α is known and the width of the exposed end of the end portion 12a of the distance marker 12 can be measured, the distance between the exposed surface of the end portion 12a (i.e., ground surface 27) and the extreme end of the end portion 12a (i.e., upper end of the gap-forming portion 8) can be calculated from the measured width of the end portion 12a and the angle α. Therefore, the depth of grinding of the top surface 27 required to completely remove the cut-off portion 17 for exposing the upper end of the gap-forming portion 8 can be calculated from the measured width of the exposed end portion 12a and the angle α of the end portion 12a. Accordingly, the cut-off portion 17 can be removed so as to assure the nominal depth dimension of the magnetic gap 14, which is equal to the width "d" of the gap-forming portion 8. The provision of the distance marker 12 permits easy and accurate control of the magnetic gap 14 by removing the cut-off portion 17 by grinding at the top surface 27. More specifically, the grinding operation to remove the cut-off portion 17 is once interrupted, and the width of the exposed end portion 12a of the distance marker 12 is measured to calculate the additional grinding depth, that is, the amount of the stock that should be further removed by the final grinding step. Thus, the provision of the distance marker 12 eliminates the need for monitoring the amount of the stock removal throughout the grinding operation. The final grinding step is just performed according to the calculated additional grinding depth.

Figure 3:
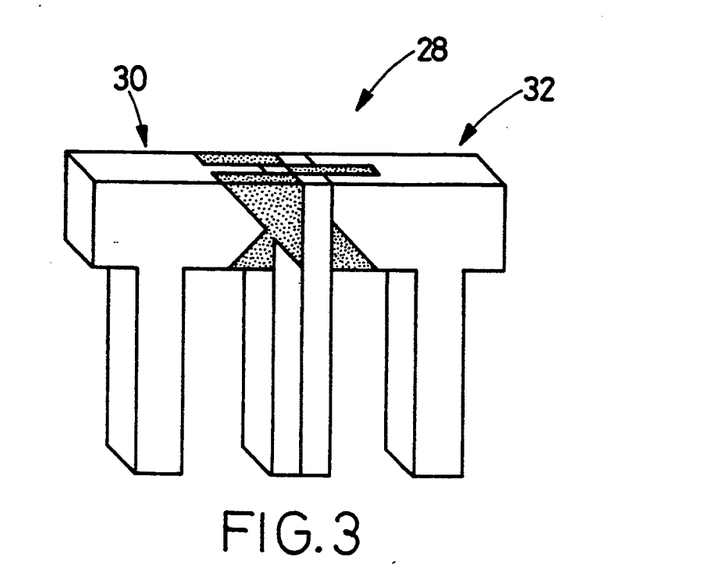
FIG. 3 is a double-core unit for a FDD head core slider, which includes the core chip of FIG. 2.

The core chip 26 whose cut-off portion 17 is removed to establish the nominal depth dimension of the magnetic gap 14 is suitably used as a writing (recording)/reading (replaying) core, and is usually used in combination with an erasing core chip. An example of a double-core unit 28 for a floppy disk drive (FDD) head core slider is illustrated in FIG. 3, in which reference numeral 30 denotes a writing/reading core 30 obtained from the core chip 26, while reference numeral 32 denotes an erasing core, which can also be prepared according to the present invention. The writing/reading core 30 and the erasing core 32, which are separately fabricated, are bonded together with a bonding glass, to produce the double-core unit 28. However, the double-core unit 28 may be prepared from a gap bar which consists of two portions that gives the two cores 30, 32. In this case, too, at least the writing/reading core 30 can be prepared according to the principle of the present invention, namely, prepared from a gap bar which has a cut-off portion having distance markers as described above. As shown in FIG. 3, the double-core unit 28 has leg portions for winding coils. The operation to form the legs may be effected on each of the two core 30, 32 before bonding thereof, or on the integral double-core body (28), or alternatively on the gap bar as an intermediate product (similar to the gap bar 16).

Figure 4:
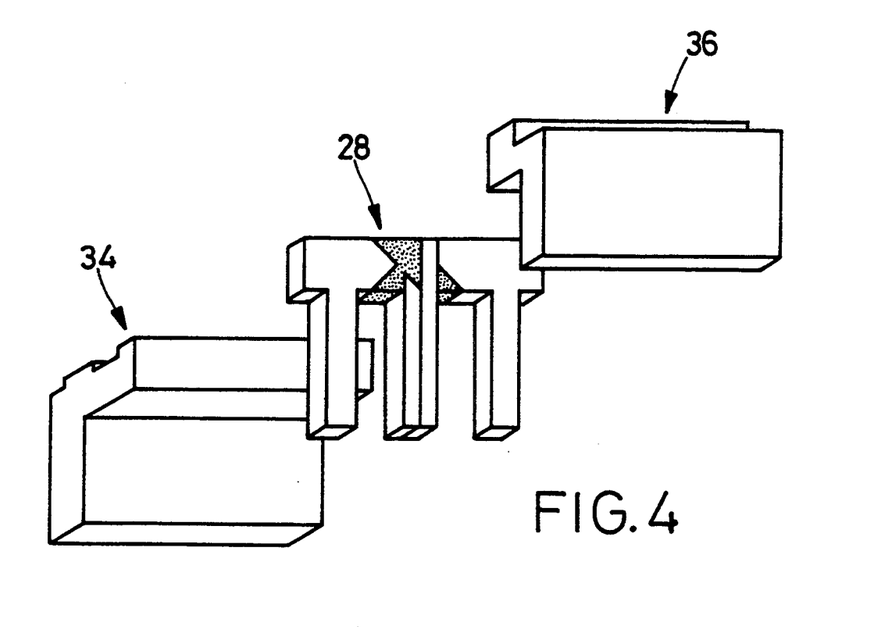
FIG. 4 is a perspective view showing a double-core unit as shown in FIG. 3 and two slider bodies, which are bonded together to prepare an intermediate assembly for a FDD head core slider.
Figure 5:
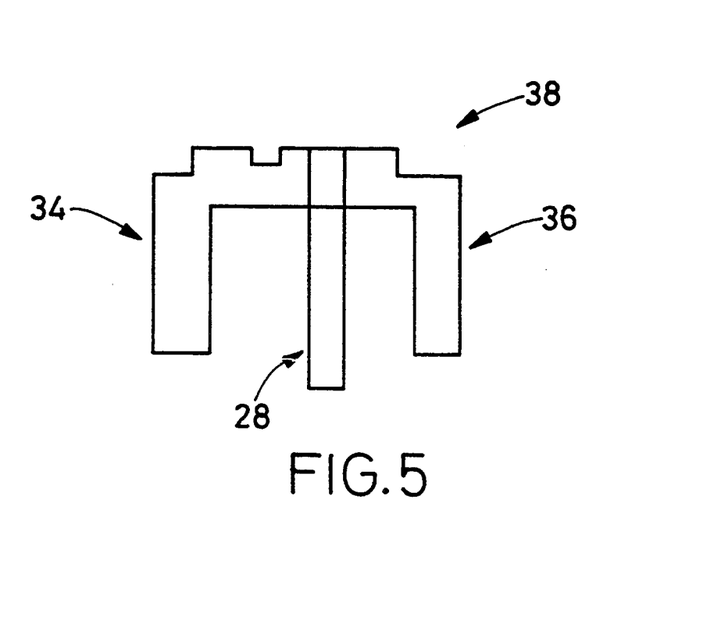
FIG. 5 is an illustration of the intermediate assembly prepared by bonding the double-core unit and the two slider bodies of FIG. 4.
Figure 6:
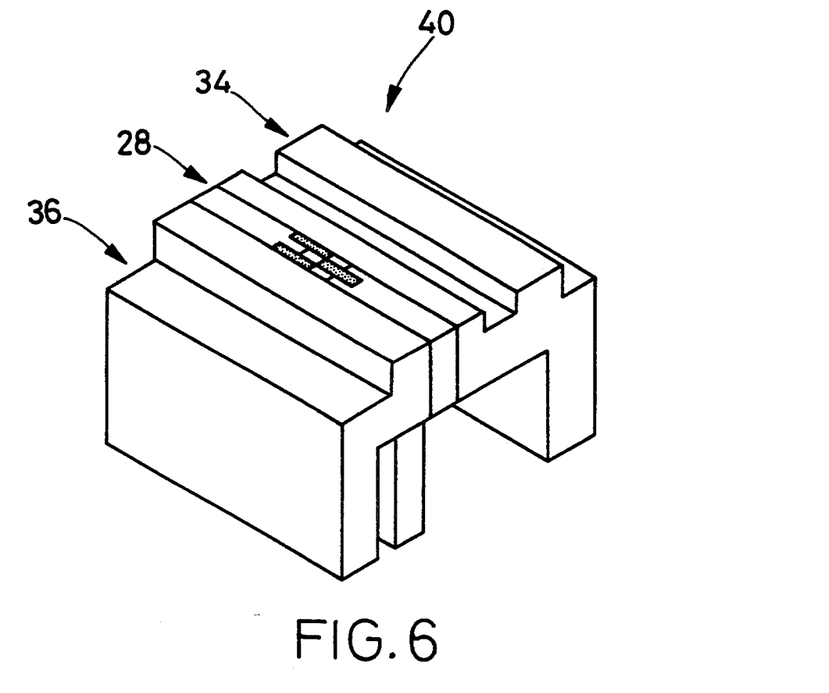
FIG. 6 is a perspective view of the FDD head core slider produced by grinding the top surfaces of the intermediate assembly of FIG. 5.

The double-core unit 28 may be used in combination with slider bodies 34, 36 as shown in FIG. 4, to produce an assembly 38 as shown in FIG. 5. The unit 28 and the slider bodies 34, 36 are bonded together with a suitable bonding glass or other adhesive. To prepare a magnetic head core slider from the assembly 38, the top surface of the double-core unit 28 (including the top surface 27 of the core chip 26) and the corresponding top surfaces of the slider bodies 34, 36 are ground to provide the unit 28 and the slider bodies 34, 36 with respective sliding surfaces. Namely, the top surface 27 of the cut-off portion 17 of the core chip 26 for the writing/reading core 30 is ground to establish the nominal depth dimension "d" of the magnetic gap 14, while utilizing the distance marker 12, as described above. Similarly, the core chip for the erasing core 32 is ground to accurately establish the depth dimension of the erasing magnetic gaps. As a result, a FDD magnetic head core slider 40 as shown in FIG. 6 is produced. The provision of the distance markers 12 in the core chips used for the cores 30, 32 assures easy and accurate control of the depth dimensions of the magnetic gaps of the head core slider 40.

Figure 7:
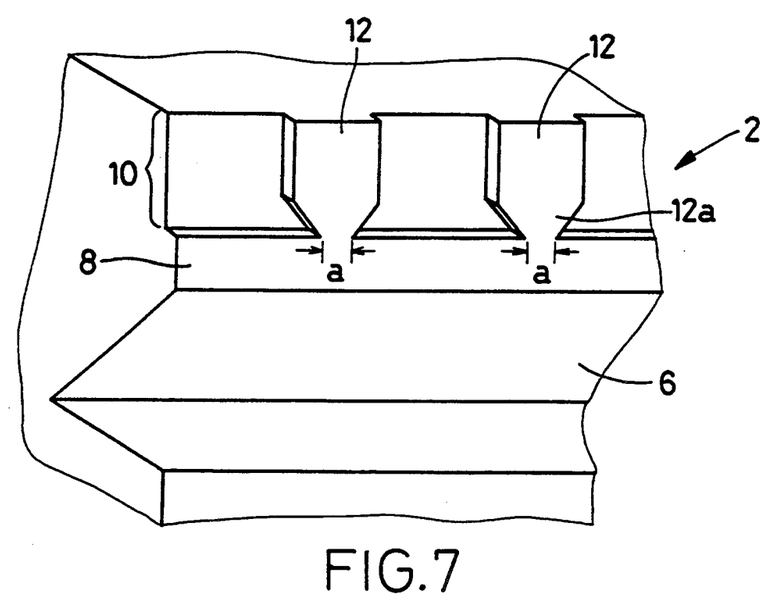
FIG. 7 is a fragmentary perspective view of a C-shaped core bar used according to another embodiment of the invention, which has distance markers which are different from those provided in the embodiment of FIGS. 1A–1C.
Figure 8:
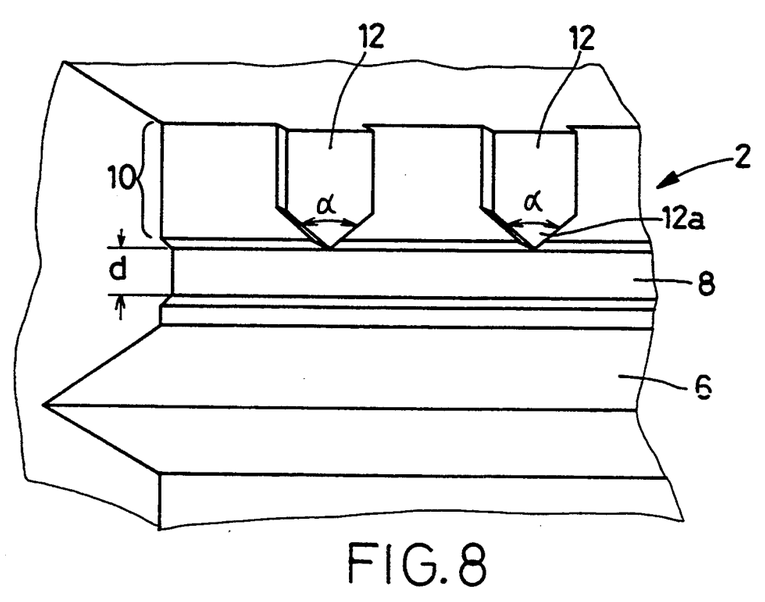
FIG. 8 is a fragmentary perspective view showing a C-shaped core bar on which a gap forming portion and an extra stock portion are formed in a manner different from that in the process step of FIG. 1A.

In the embodiment of FIGS. 1 and 2, each distance marker 12 formed on the C-shaped core bar 2 has the bilateral triangular end portion 12a whose extreme end apex is continuous to the upper end face of the gap-forming portion 8. However, the end portion of each distance marker 12 may be shaped such that the end portion 12a has a trapezoid shape having an end width "a" as shown in FIG. 7. The width "a" is considerably smaller than the width of the upper portion of the distance marker 12. In this respect, the width "a" of the triangular end portion 12a of the distance marker 12 shown in FIG. 1A is considered to be zero ("a"=0). Where the end portion of the distance marker 12 has a triangular shape, the width of the end portion exposed to the ground top surface (27) is equal to the distance to the upper end of the gap-forming portion 8 (required depth of grinding to establish the nominal depth dimension of the magnetic gap 14), if the triangle of the end portion is a bilateral triangle whose vertical angle α at the extreme end is substantially equal to 53.2°, or a right-angled triangle whose vertical angle α formed between the oblique side or hypotenuse and one of the other two sides is equal to 45°. The distance marker 12 whose end portion has a triangular, trapezoid or any other shape with a continuously varying width as described above can be formed by a chemical etching process using an appropriate etching pattern.

While the distance markers 12 provided according to the embodiment of FIGS. 1 and 2 are in the form of protrusions formed on the generally recessed cut-off portion 10, the cut-off portion 10 may be formed so as to provide distance marker in the form of recesses. Further, the distance markers 12 provided on the cut-off portion 10 of the C-shaped core bar 2 may be replaced by distance markers 12 provided on the corresponding portion of the I-shaped core bar 4. In this case, the cut-off portion 17 of the core chip 26 of FIG. 2 has the distance marker formed on the core member given by the I-shaped core bar 4. It is also possible to provide distance markers on both of the C- and I-shaped core bars 2, 4, provided that the end portion of the distance markers is suitably shaped so as to indicate the distance from the ground top surface 27 of the core chip 26 down to the upper end of the gap-forming portion 8.

Where the tolerance of the nominal depth dimension of the magnetic gap 14 which is determined by the width "d" of the gap-forming portion 8 is considerably small, for example, ±2 μm, the C-shaped core bar 2 is processed in the following manner to form the gap-forming and cut-off portions 8, 10 and the coil-winding groove 6 in the abutting surface at which the bar 2 is butted on the I-shaped bar 4. Initially, the gap-forming portion 8 and the cut-off portion 10 are concurrently formed by a combination of photolithography and chemical etching, such that an appropriate part of the abutting surface of the core bar 2 is recessed to a depth of about 2-5 μm, at selected areas so as to provide the gap-forming portion 8 and the distance markers 12 having the same height from the recessed areas. Then, the coil-winding groove 6 is formed by mechanical machining process, as with a grinding wheel, such that the upper end groove 6 is spaced from the lower end of the gap-forming portion 8, so as to prevent the groove 6 from disturbing the width dimension "d" of the gap-forming portion 8. In other words, the width "d" of the gap-forming portion 8 is determined solely by photolithography and chemical etching, and can therefore be accurately controlled to the desired depth dimension of the magnetic gap 14. Certainly, the grooving operation to form the groove 6 may precede the etching operation to form the gap-forming and cut-off portions 8, 10.

While the present invention as applied to a magnetic head core slider for a floppy disk drive (FDD) device has been described above in detail, the principle of the invention is equally applicable to a composite type magnetic head core slider for a rigid disk drive (RDD) device, as described below by reference to FIGS. 9-14.

Figure 9A:
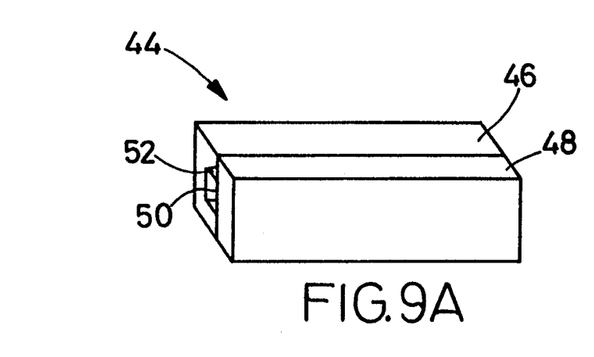
FIGS. 9A–9E are perspective views showing process steps for fabricating core chips according to a further embodiment of this invention.
Figure 9B:
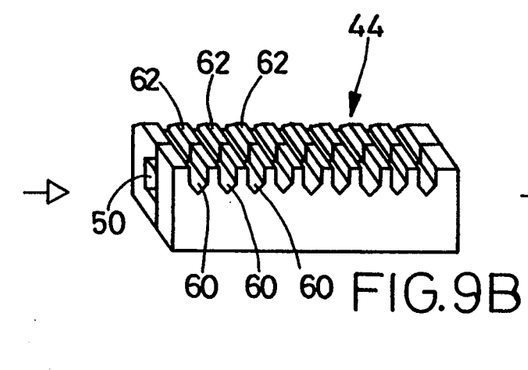
Figure 9C:
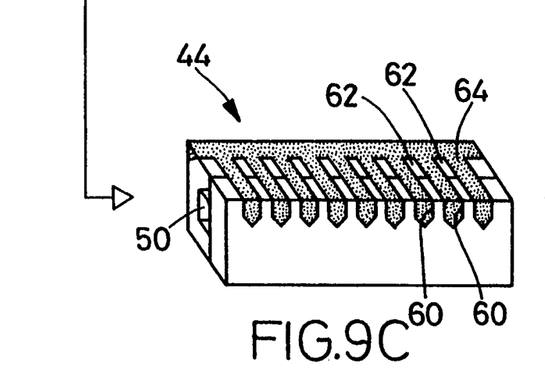
Figures 9D, 9E:
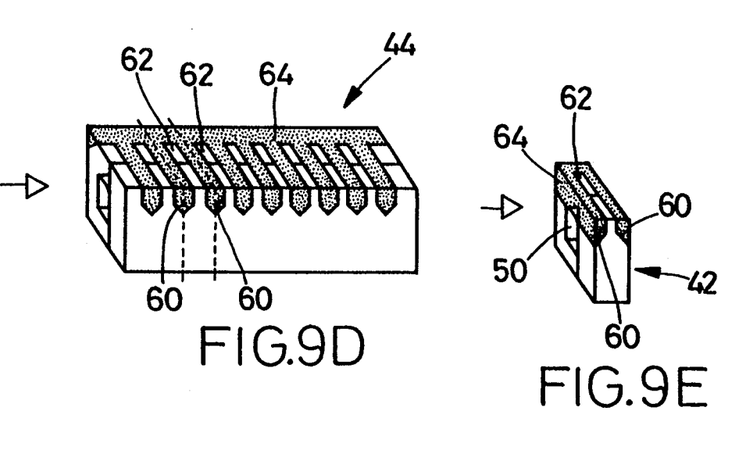

Referring to FIGS. 9A-9E, there are shown process steps for preparing core chips 42 (FIG. 9E), one of which is illustrated in FIG. 9E. As in the embodiment of FIGS. 1A-1C, the core chips 42 are prepared from a gap bar 44 consisting of two core bars 46, 48 (core members) made of a ferrite material, for example. The core bar 46 has a coil-winding groove 50 formed in one of opposite major surfaces thereof before it is bonded to the other core bar 48. In the presence of the groove 50, the gap bar 44 is given a coil-winding aperture defining a substantially annular magnetic path around it. Reference numeral 50 is also used to designate this aperture. A reinforcing glass filler 52 is applied to an upper portion of the coil-winding aperture 50, and a gap left between the two core bars 46, 48.

Figure 10:
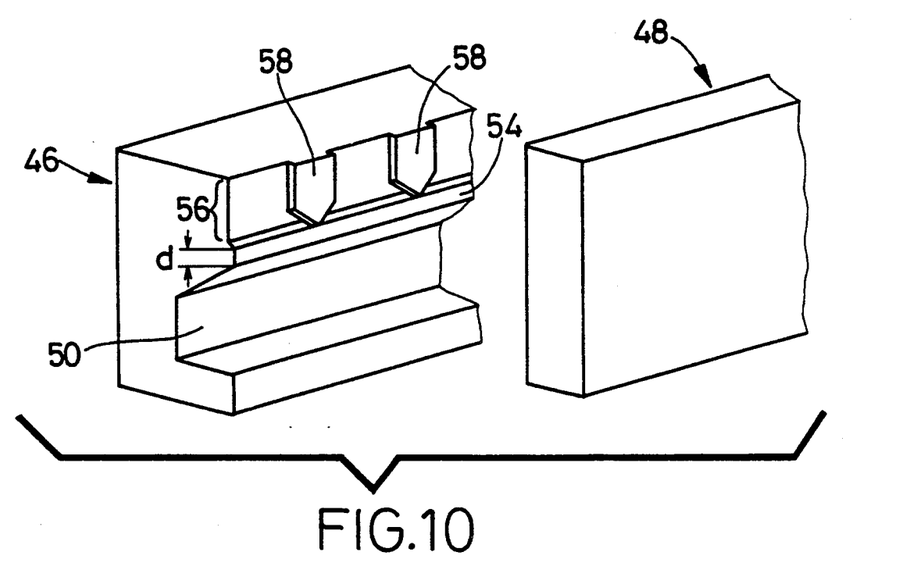
FIG. 10 is a fragmentary perspective view illustrating two core bars used in the embodiment of FIGS. 9A–9E.
Figure 11:
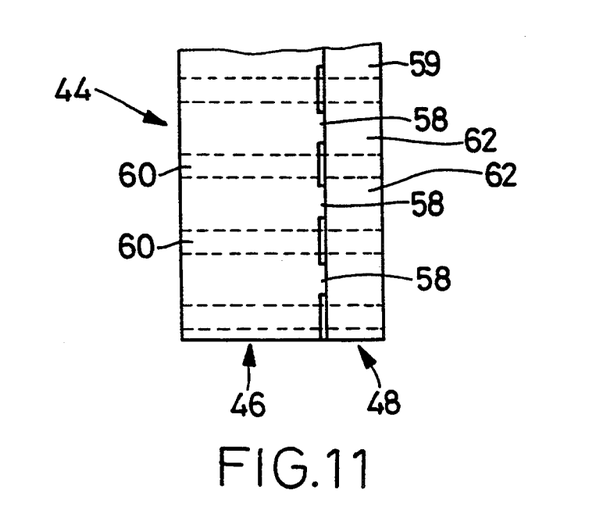
FIG. 11 is a fragmentary plan view of a gap bar shown in FIGS. 9B–9D.

The two core bars 44, 48 of the gap bar 44, which are similar to the core bars 2, 4 used in the embodiments of FIGS. 1 and 2, are shown in FIG. 10. Namely, the core bar 46 has the coil-winding groove 50, and an elongate gap-forming portion 54 formed with a width "d" in the direction of length of the gap bar 44, and a cut-off portion 56 overlying the gap-forming portion 54. Like the cut-off portion 10, the cut-off portion 56 is provided with distance markers 58 which are spaced apart from each other in the direction of extension of the gap-forming portion 54. The C-shaped core bar 46 having the portions 54, 56 and the I-shaped core bar 48 are butted and bonded together into the gap bar 44, which has a top surface 59 as shown in FIG. 11.

The gap bar 44 is then subjected to a chamfering operation at one corner thereof, and a grooving operation on the top surface 59 to form parallel preliminary width-defining grooves 60, which as shown in FIG. 9B, define preliminary tracks 62 having a preliminary width. The grooves 60 are spaced apart from each other in the direction of length of the gap bar 44, by a predetermined distance corresponding to the pitch of the preliminary tracks 62. Each groove 60 has a depth reaching a point below the upper end of the coil-winding aperture 50. The upper end of each distance marker 58 is exposed on the corresponding preliminary track 62. As shown in FIG. 9C, the grooves 46 are filled with a protective glass filler 64 similar to the glass filler 22, while the filler is in a molten state.

Figure 12:
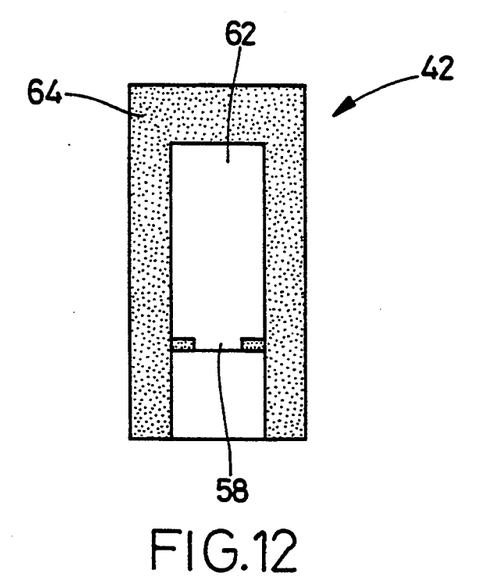
FIG. 12 is a view illustrating the sliding surface of a core chip produced in the process of FIGS. 9A–9E.

The gap bar 44 whose preliminary width-defining grooves 60 are filled with the protective glass filler 64 is then cut into pieces, along parallel planes indicated in dashed lines in FIG. 9D, which are parallel to the direction of extension of the preliminary tracks 62. Thus, there are prepared a plurality of core chips 42, one of which is shown in FIG. 9E. Each core chip 42 has a top surface on which the upper end of the distance marker 58 is exposed, as shown in FIG. 12. This top surface is provided by a cut-off portion of the core chip 42, which consists of the cut-off portion 56 of the C-shaped core bar 46 and the corresponding portion of the I-shaped core bar 48. As in the preceding embodiment of FIGS. 1 and 2, the cut-off portion of the core chip 42 is removed by grinding the top surface when the core chip 42 and a slider body 66 (FIG. 13A) are simultaneously ground. The width of the distance marker 58 performs the same function as the distance marker 12 described above with respect to the first embodiment of FIGS. 1 and 2.

Figure 13A:
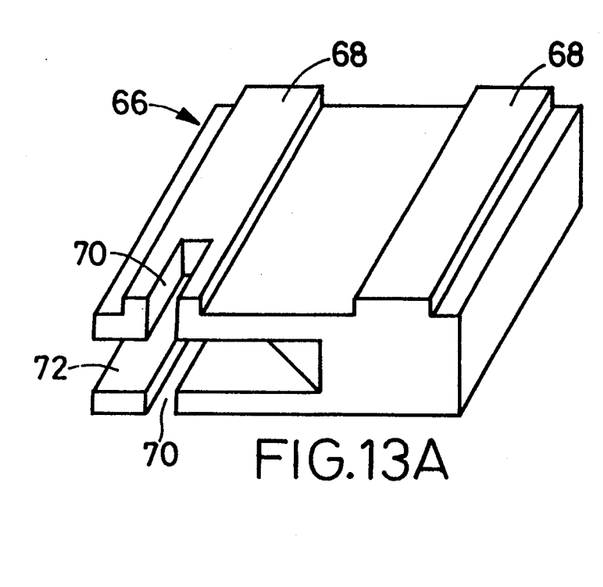
FIGS. 13A, 13B and 13C are perspective views showing a process of fabricating a RDD head core slider using the core chip produced in the process of FIGS. 9A–9E.

On the other hand, the slider body 66 of FIG. 13A is prepared from a non-magnetic material such as $CaTiO_3$. The slider body 66 has a pair of parallel air bearings 68, 68 formed on the surface corresponding to the top surface of the core chip 42 (surface of the preliminary track 62). The right and left air bearings 68 have a predetermined height and a predetermined spacing therebetween. A chip receiving groove 70 is formed so as to extend through one of lengthwise opposite ends of the left air bearing 68. The groove 70 has a width as measured in the direction of width of the air bearings 68, which width is slightly (about 10-15 $\mu$m) larger than the thickness of the core chip 42 as measured in the direction of width of the track 62. Further, a coil-winding groove 72 is formed in one corner portion of the slider body 66, so as to traverse the chip receiving groove 70, in the direction parallel to the top surface of the slider body 66 on which the air bearings 68 are formed.

Figure 13B:
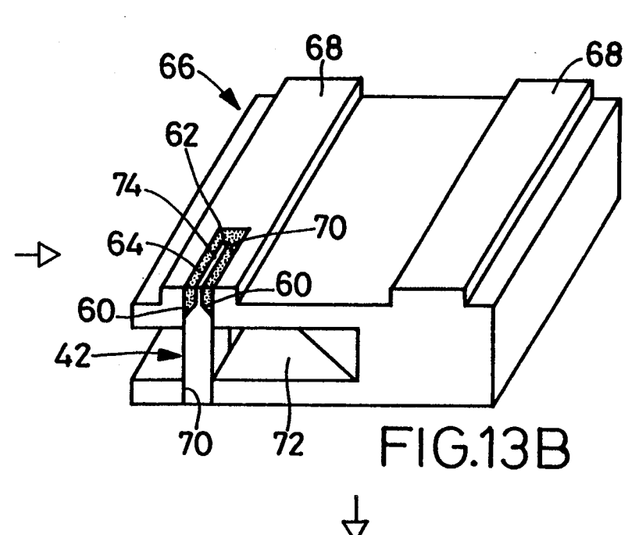

In the chip receiving groove 70 of the slider body 66 thus prepared, there is inserted the core chip 42, as shown in FIG. 13B, such that the bottom of the core chip 42 is flush with the bottom surface of the slider body 66. The slider body 66 with the core chip 42 positioned in the groove 70 is then heated to soften or melt the glass filler 64 in the grooves 60 of the core chip 42. As a result, the core chip 42 is fixed in the slider body 66 with the glass filler 64. If necessary to assure firm bonding of the core chip 42 to the slider body 66, a suitable adhesive such as epoxy resin is poured in between the rear portion of the core chip 42 and the inner surfaces of the groove 70.

In the next step, the slider body 66 with the core chip 42 fixed therein is tapered and chamfered, to provide a tapered leading end portion and a chamfered trailing end portion, and is ground at the top surfaces of the core chip 42 and the air bearings 68, until the cut-off portion 56 is removed so as to expose the upper end of the gap-forming portion 54, in order to establish the nominal depth dimension "d" of a magnetic gap 74 which will be described. The depth of grinding or amount of stock removal from the cut-off portion, which is required to establish the nominal depth dimension "d" of the magnetic gap 74, can be accurately determined by measuring the width of the exposed end portion of the distance marker 58 during interruption of the grinding operation, as described above with respect to the first embodiment. In this embodiment, the distance marker 58 has a triangular end portion, as shown in FIG. 10.

Figure 13C:
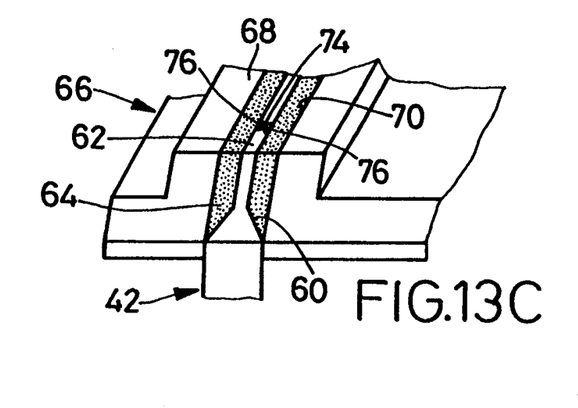
Figure 14:
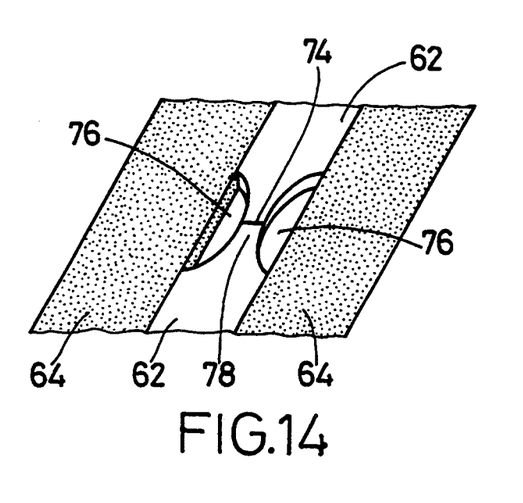
FIG. 14 is a fragmentary enlarged view of a magnetic head gap portion of the core chip of the head core slider fabricated in the process of FIGS. 13A–13C.

The slider 66 with its core chip 42 ground according to the measured width of the exposed end portion of the distance marker 58 is then subjected to an etching operation to form a pair of final width-defining recesses 76, as shown in FIG. 13C. These final width-defining recesses 76 define an effective track 78 having the nominal width, which defines the nominal width of the magnetic gap 74, as shown in FIG. 14. The provision of the recesses 76 permits the nominal width of the effective track 78 (magnetic gap 74) to be sufficiently small for allowing the magnetic head core slider to effect a high-density recording operation on a magnetic disk.

More specifically, a portion of the preliminary track 62 in which the gap formed by the two core members (46, 48) is open is subjected to an etching operation such as laser-induced etching or chemical etching, whereby the opposed recesses 62, 62 are formed so as to define the effective track 78 whose width and length are smaller than the preliminary track 62. With the effective track 78 thus formed, the effective magnetic gap 78 having the nominal width is formed. The recesses 76 have a depth which is smaller than the depth of the preliminary width-defining grooves 60 but is larger than the nominal depth "d" of the magnetic gap 74, which is established by the grinding operation using the distance marker 58 as described above. That is, the recesses 76 reach down into the upper portion of the coil-winding aperture 50. The etching operation to form the recesses 76 may be accomplished in a known manner, for example, by laser-induced etching within an etching liquid containing KOH. With the recesses 76 formed by this etching operation, the width of the magnetic track 78 can be made as small as 10 $\mu$m or less.

Thus, the nominal width of the effective magnetic gap 74 is defined by the effective track 78 formed by narrowing the width of the portion of the preliminary track 62 near the magnetic gap 74. Thus, the magnetic head core slider using the core chip 42 is completed. This head core slider having the narrow and short effective track 78 satisfies the recent need for high-density recording on a magnetic disk, without chipping of the track portion which is encountered in the known fabrication process for a composite type head core slider due to the relatively long, narrow and high track, during formation of the track. Accordingly, the instant process for the composite type magnetic head core slider is effective to eliminate or minimize the conventionally experienced drawbacks, such as a decrease in the yield ratio due to to the chipping of the track portion, an increase in the magnetic resistance at the track portion, an adverse influence of the strain of the track portion caused by the protective glass filler, and reduction in the signal level upon information reading from the magnetic disk.

While the present invention has been described above in detail in its presently preferred embodiments, it is to be understood that the invention is not limited to the details of the illustrated embodiments, but may be embodied with various changes, modifications and improvements in connection with the magnetic head core chip and the process for fabricating the head core slider, which may occur to those skilled in the art, without departing from the spirit and scope of the invention defined in the following claims.

What is claimed is:

1. A process of fabricating a magnetic head core slider, comprising the steps of:

fixing a core chip in a slider body, said core chip including (i) a first and a second core member which are butted and bonded together so as to define a coil-winding aperture and which cooperate to provide a gap-forming portion on one side of said coil-winding aperture, (ii) a cut-off portion which is provided adjacent to said gap-forming portion and which provides a top surface of the core chip, said gap-forming portion defining a magnetic gap which extends from said aperture, said first and second core members having a pair of width-defining grooves which extend therebetween so as to define a track whose width dimension determines a width dimension of said magnetic gap, and (iii) a distance marker provided in said cut-off portion so as to extend from said top surface to said gap-forming portion, said distance marker having an end portion adjacent to said gap-forming portion, said end portion being shaped so as to indicate a distance between said top surface and said gap-forming portion when said cut-off portion is removed to provide a sliding surface of the core chip in which said magnetic gap is open and which determines said nominal depth dimension of the magnetic gap; and grinding said top surface of said core chip together with a corresponding surface of said slider body to remove said cut-off portion and said distance marker by an amount corresponding to the distance between said top surface and said gap-forming portion, which is indicated by said end portion of said distance marker, so as to establish said nominal depth dimension of said magnetic gap and provide a sliding surface on said slider body.

2. A process according to claim 1, wherein said track serves as a preliminary track, said process further comprising etching said sliding surface of said preliminary track to form a pair of opposed final width-defining recesses adjacent to said magnetic gap, said final width-defining recesses defining an effective track which extends across said magnetic gap and which has a nominal width smaller than said width dimension of said preliminary track and a length smaller than said preliminary track, said nominal width of said effective track determining a nominal width of said magnetic gap smaller than said width dimension of said magnetic gap before said opposed final width-defining recesses are formed.

3. A process according to claim 1, further comprising the step of forming on said slider body a pair of parallel air bearings as said sliding surface of said slider body, and wherein said step of fixing said core chip in a slider body comprises: forming a chip-receiving groove formed through one of lengthwise opposite end portions of each of at least one of said pair of air bearings; accommodating said core chip in said chip-receiving groove; and bonding said core chip in said chip-receiving groove with a glass filler, such that said top surface of said core chip is exposed on said one of lengthwise opposite end portions of said each of at least one of said pair of air bearings.

4. A process of fabricating a magnetic head core slider, comprising the steps of:

fixing a core chip in a slider body, said core chip including (i) a first and a second core member which are butted and bonded together so as to define a coil-winding aperture and which cooperate to provide a gap-forming portion on one side of said coil-winding aperture, (ii) a cut-off portion which is provided adjacent to said gap-forming portion and which defines a top surface of the core chip, and (iii) a distance marker provided in said cut-off portion so as to extend to said gap-forming portion, said distance marker being shaped so as to indicate a distance to said gap-forming portion as said cut-off portion is removed to provide a sliding surface of the core chip; and grinding said top surface of said core chip together with a corresponding surface of said slider body to remove said cut-off portion and said distance marker by an amount indicated by said distance marker so as to expose said gap-forming portion and to establish a nominal depth dimension of said magnetic gap and provide a sliding surface on said slider body.

5. The process of claim 1, wherein said distance marker extends to and contacts said gap forming portion.

6. The process of claim 4, wherein said distance marker extends to and contacts said gap forming portion.

* * * * *